United States Patent [19]

Best

[11] Patent Number: 5,000,092

[45] Date of Patent: Mar. 19, 1991

[54] PRINTING PROCESSES

[75] Inventor: Robert D. M. Best, Redcar, England

[73] Assignee: Chemoxy International Limited, England

[21] Appl. No.: 163,175

[22] Filed: Feb. 26, 1988

Related U.S. Application Data

[63] Continuation of Ser. No. 650,979, Sep. 14, 1984, which is a continuation of Ser. No. 441,326, Nov. 12, 1981.

[30] Foreign Application Priority Data

Nov. 13, 1981 [GB] United Kingdom ................. 8134336
Aug. 7, 1982 [GB] United Kingdom ................. 8223637

[51] Int. Cl.$^5$ ............................................. B41F 31/00
[52] U.S. Cl. .................................... 101/491; 101/130; 101/450.1; 101/451; 106/31; 106/271; 106/272
[58] Field of Search ......................... 106/31, 271, 272; 101/426, 130, 150, 450.1, 451, 491

[56] References Cited

U.S. PATENT DOCUMENTS

| | | | |
|---|---|---|---|
| 3,000,808 | 9/1961 | Roden | 208/23 |
| 3,189,469 | 6/1965 | Littler et al. | 106/272 |
| 3,249,448 | 5/1966 | Coburn et al. | 106/31 |
| 3,513,000 | 5/1970 | Nicolas et al. | 101/450.1 |
| 3,847,622 | 11/1974 | Brandl et al. | 106/271 |
| 3,847,637 | 11/1974 | Luszczak | 106/271 |
| 3,994,737 | 11/1976 | Bienvenu | 106/31 |
| 4,180,408 | 12/1979 | Bienvenu et al. | 106/31 |

FOREIGN PATENT DOCUMENTS 1454899 11/1976 United Kingdom .

Primary Examiner—Amelia Burgess Yarbrough
Attorney, Agent, or Firm—Remy J. VenOphem

[57] ABSTRACT

Printing ink vehicles including an emulsion of a mineral oil, preferably a light mineral oil; a significant amount of water; and an emulsifying agent including an amine or alkali metal salt of an oxidized hydrocarbon wax. Printing inks incorporating the vehicles include the vehicle together with a coloring agent such as a pigment.

44 Claims, No Drawings

A
PRINTING PROCESSES

This is a continuation, of application Ser. No. 650,979, filed Sept. 14, 1984, which is a continuation of application Ser. No. 441,326, filed Nov. 12, 1982.

BACKGROUND OF THE INVENTION

I. Field of the Invention:

This invention is concerned with improvements in and relating to printing inks.

II. Description of the Prior Art:

Typical "news" inks include a finely divided pigment, dispersed in an oily vehicle containing a binder resin. The principal component of the vehicle is an oil base, typically an aromatic naphthenic or paraffinic oil base, which may, for example, form about 90% by weight of the ink vehicle. The use of such inks leads to disadvantages in practice, for example misting—that is, the formation of very small droplets of ink and oil vapor which settle on the press and which may fall on the paper being printed, in addition to causing possible environmental hazards in the print shop. A further disadvantage of conventional news inks is the poor smear or smudge resistance of the printed matter.

SUMMARY OF THE PRESENT INVENTION

It has now been found, in accordance with the present invention, that a printing ink vehicle may be prepared by emulsifying a base oil with a significant quantity of water using certain emulsifying agents, as defined more particularly hereinafter, and that inks prepared from such vehicles are, in use, markedly less prone to misting and the generation of vapor than are the conventional inks discussed above.

According to the invention, therefore, there is provided a printing ink vehicle including an emulsion of a mineral oil and water and containing, an emulsifying agent, an amine or alkali metal salt of an oxidized acid wax.

The invention also provides an ink with a vehicle as defined above and containing one or more coloring agents.

DETAILED DESCRIPTION OF THE PREFERRED EMBODIMENT OF THE PRESENT INVENTION

The oil component of the ink vehicle of the invention suitably includes a light mineral oil, for example having a viscosity at 25° C. of from 1 to 14 poise, preferably from 1 to 7 poise, especially about two poise.

The emulsifying agent used in the ink vehicle is an amine or alkali metal soap of an oxidized paraffinic wax. Oxidized paraffinic waxes are well-known materials. They are commonly prepared by the air oxidation of a wax containing predominantly paraffinic components by blowing air through a melt of the wax, for example at a temperature of from 100° to 200° C., in the presence of an oxidation catalyst. The starting paraffinic wax may be a so-called "microcrystalline" wax (in which case it is believed that the long chain paraffins are largely in the iso-form); a crystalline wax (in which it is believed that the long chain paraffins are largely straight chain paraffins); or a paraffinic scale or slack wax, which are mixtures of crystalline and/or microcrystalline waxes in oil. The products (oxidate acids) themselves are complex mixtures containing unreacted starting material and oxidized products such as acids, lactones and esters. The degree of oxidation of an oxidized paraffinic wax is commonly indicated by its acid number (the number of milligrams of potassium hydroxide required to neutralize a one gram sample of the oxidate) and for use in the present invention, the oxidized wax suitably has an acid number of from 40 to 60, preferably from 40 to 50, most preferably from 45 to 50. One preferred class of oxidized waxes for use in accordance with the invention are oxidized waxes derived from a crystalline scale or slack wax, and preferably having an acid number of from 40 to 50, a saponification value of from 100 to 130, a viscosity, measured at 210° F., of from 16 to 40 centistokes, preferably 20 to 30 centistokes, and a cone penetration of less than 50° at 25° C., preferably less than 30 at 25° C.

Another preferred class of oxidized waxes for use in accordance with the invention are liquid oxidate acid mixtures derived from predominantly paraffinic oils and preferably having an acid number of from 40 to 50, a saponification value of from 100 to 120, and a viscosity (measured at 210° F.) of 2.5 to 10, preferably 3 to 8, centistokes, and a pour point below 0° C. Such oxidized materials themselves already contain paraffinic oils and thus an ink vehicle in accordance with the invention can be prepared therefrom by saponifying the oxidized oil and then emulsifying the saponified material with water.

In the present invention, the oxidized paraffin wax is employed as an amine or alkali metal soap thereof, suitably a hydroxyalkyl amine soap, e.g. a tri(hydroxyethyl) amine soap or a sodium soap. The soap is prepared by reaction of the oxidate with an appropriate saponifying agent such as an amine or alkali metal hydroxide or carbonate. The saponification may be carried out by direct reaction of the saponifying agent with the molten oxidate (for example at a temperature of from 70° to 150° C.) or by reaction of the oxidate with a solution of the saponifying agent.

The ink vehicle of the invention is conveniently prepared by first blending the oil base with the oxidate soap and then emulsifying the resultant blend with water. Both operations are suitably carried out at moderately elevated temperatures, for example from 75° to 95° C., preferably from 85° to 95° C. The weight ratio of oxidate soap to mineral oil base employed to produce the first blend is suitably such that the soap forms from 15 to 50% by weight, preferably from 25 to 40% by weight, of the total mixture of soap and mineral oil base. Conveniently the blending operation is carried out by first placing the soap in a suitable blending vessel, heating it to the required temperature, for example about 90° C., and then stirring in the mineral oil and blending the resultant mixture, for example for a period of from 30 minutes to 1 hour. The resultant blend is then emulsified with water and this emulsification is conveniently carried out by adding warm water to the heated blend of soap and mineral oil and stirring at an elevated temperature, e.g. about 90° C., for, for example, from 30 to 60 minutes. The whole emulsion is then allowed to cool, preferably with stirring. The weight ratio of mineral oil/soap blend to water employed is suitably such that the resultant emulsion, the ink vehicle of the invention, contains at least 10% by weight of water, preferably at least 20% by weight of water. When employing the preferred soaps, as indicated above, it is possible to introduce water in amounts of up to 50% by weight of the total ink vehicle.

The resultant ink vehicle may then be converted to a printing ink by mixing it with an appropriate coloring agent, e.g. a pigment, such as carbon black, in which case a fluffy grade carbon black is desirably employed. Alternatively, a predispersed pigment may be employed.

The mixing of the ink vehicle with the pigment will be generally carried out using conventional apparatus for the introduction of pigments into ink vehicles, for example high speed shear mixers, pebble mills or triple roll mills.

Alternatively, the ink may be prepared by firstly mixing the oxidate soap/mineral oil blend with the coloring agent (which may be a pigment such as carbon black, desirably a fluffy grade carbon black, or a granulated or predispersed pigment) and then blending the mixture with water. After dispersion or dissolution of the coloring agent in the oxidate soap/oil blend, the water, in an amount of up to 50% by weight of the total ink vehicle, may be blended with the mixture at a temperature between ambient and 90° C. and preferably between 60° and 70° C.

In addition to the oxidized wax soaps the ink vehicles and inks of the invention may also contain a minor proportion (relative to the oxidized wax soap) of other soaps obtained by the saponification of saponifiable materials of natural or synthetic origin. Examples of such other saponifiable materials include materials of vegetable origin such as plant waxes (e.g. carnauba or candelilla wax), plant oils, plant fats, plant gums and plant resins (e.g. conifer resins including colophony); materials of animal origin such as animal waxes (e.g. beeswax), animal oils (e.g. bone oil) and animal fats (e.g. tallow); and materials of mineral or synthetic origin such as mineral waxes (e.g. montan wax), refined petroleum waxes (e.g. ozokerite), tall fatty acids and oxidized alpha-olefins. Such other soaps are suitably present in an amount of less than 25% by weight preferably less than 10% by weight, based on the weight of oxidized wax soap.

As noted above, inks based on the ink vehicles of the invention have a marked advantage over conventional inks in that, in use, they give rise to much reduced misting and vapor generation as compared with the conventional inks. As a result the working atmosphere in a print shop may be markedly cleaner. Another important advantage of the printing ink vehicles of the invention, as compared with conventional printing ink vehicles, is that due to the incorporation of relatively high amounts of water they are generally lower in basic raw material and production costs.

Further, inks produced based on the ink vehicles of the invention have been found to give faster drying rates than conventional letterpress inks, to be equally suited to newsprint of high or alow porosity and to give a marked improvement in suppression of paper dust. Another important advantage of the ink vehicles of the invention is that in contrast to conventional inks containing aromatic oil bases they have a much reduced tendency to swell the rubber rollers of printing machines.

In contrast to conventional inks containing hydrogenated base oils the ink vehicles of the invention provide a much faster rate of wetting of the pigment, consequently the dispersion time and resultant savings in utility use give further reductions in the cost of manufacture. Also, as compared with conventional inks containing aromatic or unrefined or partly refined naphthenic or paraffinic base oils, the ink vehicles of the invention can provide a much stronger color response when colored pigments are employed and such colored pigments will not discolor as quickly when exposed to natural or artificial light. Consequently the amount of pigment necessary to achieve a given color response is much lower.

Inks produced in accordance with the invention have, as compared with conventional inks, stronger fixation and bonding properties to a substrate upon which they are printed. Consequently there is a substantial improvement in the resistance to smearing or smudging of the printed matter when handled. This is a most desirable property since it avoids the nuisance, to the reader of the printed matter, e.g. a newspaper, of ink transfer to the skin.

In order that the invention may be well understood, the following examples are given by way of illustration only.

EXAMPLE 1

(a) Preparation of Amine Soap

An oxidized acid wax having an acid number between 40 and 50 mg KOH/gm (Hypax 450 LS, manufactured by the assignee herein) was heated to a temperature of 80° C. 13.5% by weight of triethanolamine (based on the weight of the acid oxidate) was added to the heated material and the whole mass stirred for 30 minutes or until most of the acids were converted to their amine soap.

(b) Preparation of soap/oil blend

The amine soap was heated to a temperature of between 70°-90° C. Mineral oil (2 poise) was blended with the heated soap to give a blend containing 67% weight of oil and 33% weight of amine soap. The blend was then allowed to cool with constant stirring.

(c) Preparation of Ink 100 parts by weight of the soap/oil blend were introduced into a suitable mixer capable of dispersing carbon black pigment. The mixer was started. Then 20 parts by weight of fluffy furnace grade carbon black, having a nitrogen surface area between 46-220 square meters/gram, were introduced into the mix. When the carbon was fully dispersed with the soap/oil blend as indicated by its consistency and flow property, 60 parts by weight of water were introduced into the mass at a temperature of 65° C. with continued mixing until the ink had a consistent flow and appearance.

The resultant ink vehicle was suitable for use in rotary letter press machines operating at speeds between 40,000-50,000 copies per hour.

EXAMPLE 2

(a) Preparation of Sodium Soap

An oxidized acid wax having an acid number between 40 and 50 mg KOH/gm, a drop melting point of 55° C. and a viscosity of 16-24 centistokes at 210° F. (Hypax 450 LS manufactured by the assignee herein) was heated to a temperature of 80° C. 4.5% by weight of sodium hydroxide (based on the weight of the acid oxidate) was added to the heated material and the whole mass stirred for 30 minutes or until most of the acids were converted to their sodium soaps.

(b) Preparation of soap/oil blend

The sodium soap produced in (a) above was heated to a temperature of between 70°–90° C. Naphthenic mineral oil (1.5 poise) was blended with the heated soap to give a blend containing 80% by weight of oil and 20% by weight of amine soap. The blend was then allowed to cool with constant stirring.

(c) Preparation of Ink 100 parts by weight of the soap/oil blend were introduced into a suitable mixer capable of dispersing carbon black pigment. The mixer was started. Then 20 parts by weight of fluffy furnace grade carbon black, having an iodine number of 28 mg/g and a DBP absorption of 66 m$^3$/100 g, and 2 parts by weight of a bituminous additive (Gilsonc Selects) were introduced into the mix. When the carbon was fully dispersed with the soap/oil blend as indicated by its consistency and flow property, 49 parts by weight of water were introduced into the mass at a temperature of 65° C. with continued mixing until the ink had a consistent flow and appearance.

The resultant ink had a viscosity of 9–13 poise at 25° C. and flow rates of approximately 170 mm after one minute and 290 mm after 5 minutes.

The resultant ink could be used with paper of both high and low porosity and was suitable for use on hard and soft polymer printing plates. In this latter case it was found to be self-cleaning, thus avoiding build up of paper fiber or dust in half tones. The basic vehicle (soap/oil/water emulsion) can also be used for the operation of colored inks for use on high speed rotary letterpresses.

EXAMPLE 3

(a) Preparation of soap

Following the procedure of Example 2 (a) a soap was prepared from a liquid oxidized hydrocarbon wax containing predominantly paraffinic hydrocarbons having an acid number of 45–50, a viscosity at 210° F. of 4–6 centistokes and a pour point of −10° C. (Hypax 150, sold by the assignee herein).

(b) Preparation of soap/pigment blend 80 parts by weight of the liquid soap obtained in (a) above was milled on a triple roll mill with 20 parts by weight of a low structure carbon black, to give a black varnish.

(c) Preparation of ink 100 parts by weight of the black varnish prepared in (b) above and 60 parts by weight of water were blended together following the procedure described in Example 2 (c) but using a temperature of 60° C. to produce an ink. The resultant ink was suitable for use as a flexographic ink and it was noted that such an ink is readily cleaned from a flexographic plate, after use, with warm water.

EXAMPLE 4

(a) Preparation of soap solution

An oxidized acid wax having an acid number of 45–50, a drop melting point of 55° C. and a viscosity of 16–24 centistokes at 210° F. (Hypax 450L, manufactured by the assignee herein) was reacted with 2.8% by weight of sodium hydroxide (based on the weight of the oxidized wax) and water was then added to the resultant composition over a period of 30 minutes using a high speed turbo mixer to give a dispersion containing 40% by weight of sodium soap solids.

(b) Preparation of soap/oil/water emulsion 30 parts by weight of a 1.5 poise hydrocarbon oil were added to 100 parts by weight of the emulsion produced in (a) above and blended therewith following the general procedure described in Example 2 (c) to give an ink vehicle in accordance with the invention.

This vehicle could be blended with water soluble pigments and gloss improvers suitable for corrugated and other absorbent substrates. For example, in an ink prepared by blending 15% by weight of a water soluble pigment, the varnish described above could be employed to provide a fast-drying flexographic ink having good resistance to humidity.

I claim:

1. In a printing process comprising the steps of applying an ink to a printing plate, said ink including an oil-based ink vehicle; and bringing said inked plate into contact with an object to be imprinted; the improvement comprising the step of including in said oil-based ink vehicle at least about 10 to 50 percent by weight water and about 7 to 45 percent by weight of a monovalent salt of an oxidized acid wax, the substantial remainder of said vehicle comprising an oil, in which the weight of said salt forms about 15 to 50 percent of the total weight of said oil and said salt.

2. The invention according to claim 1, wherein said vehicle comprises about 20 percent by weight water, and about 8 to 38 percent by weight of said salt, in which the weight of said salt forms about 25 to 20 percent of the total weight of said oil and said salt.

3. The invention according to claim 1, wherein said oil is a mineral oil having a viscosity at 25° C. of from 1 to 14 poise.

4. The invention according to claim 2, wherein said oil is a mineral oil having a viscosity at 25° C. of from 1 to 14 poise.

5. The invention according to claim 1, wherein said salt has an acid number of from 40 to 60 mg KOH/g.

6. The invention according to claim 2, wherein said salt has an acid number of from 40 to 60 mg KOH/g.

7. The invention according to claim 1, wherein said oxidized acid wax is a liquid oxidate mixture derived from paraffinic oils.

8. The invention according to claim 2, wherein said oxidized acid wax is a liquid oxidate mixture derived from paraffinic oils.

9. The invention according to claim 1, wherein said salt comprises the tri(hydroxyethyl)amine soap of said oxidized acid wax.

10. The invention according to claim 2, wherein said salt comprises the tri(hydroxyethyl)amine soap of said oxidized acid wax.

11. The invention according to claim 1, wherein said salt comprises the sodium salt of said oxidized acid wax.

12. The invention according to claim 2, wherein said salt comprises the sodium salt of said oxidized acid wax.

13. In a printing process comprising the steps of applying an ink to a printing plate, said ink including an oil-based ink vehicle; and bringing said inked plate into contact with an object to be imprinted; the improvement comprising the step of including in said oil-based ink vehicle at least about 10 to 50 percent by weight water and about 7 to 45 percent by weight of a monovalent salt of an oxidized acid wax, the substantial remainder of said vehicle comprising an oil, in which the weight of said salt forms about 15 to 50 percent of the total weight of said oil and said salt, said improvement further comprising the step of incorporating a coloring agent with said ink vehicle in said ink.

14. The invention according to claim 13, wherein said vehicle comprises about 20 percent by weight water, and about 8 to 38 percent by weight of said salt, in which the weight of said salt forms about 25 to 20 percent of the total weight of said oil and said salt.

15. The invention according to claim 13, wherein said oil is a mineral oil having a viscosity at 25° C. of from 1 to 14 poise.

16. The invention according to claim 14, wherein said oil is a mineral oil having a viscosity at 25° C. of from 1 to 14 poise.

17. The invention according to claim 13, wherein said salt has an acid number of from 40 to 60 mg KOH/G.

18. The invention according to claim 14, wherein said salt base has an acid number of from 40 to 60 mg KOH/g.

19. The invention according to claim 13, wherein said oxidized acid wax is a liquid oxidate mixture derived from paraffinic oils.

20. The invention according to claim 14, wherein said oxidized acid wax is a liquid oxidate mixture derived from paraffinic oils.

21. The invention according to claim 13, wherein said salt comprises the tri(hydroxyethyl)amine soap of said oxidized acid wax.

22. The invention according to claim 14, wherein said salt comprises the tri(hydroxyethyl)amine soap of said oxidized acid wax.

23. The invention according to claim 13, wherein said salt comprises the sodium salt of said oxidized acid wax.

24. The invention according to claim 14, wherein said salt comprises the sodium salt of said oxidized wax.

25. The invention according to claim 13, wherein said coloring agent comprises a pigment.

26. The invention according to claim 25, wherein said pigment comprises carbon black.

27. The invention according to claim 13, wherein said coloring agent comprises a pigment.

28. The invention according to claim 27, wherein said pigment comprises carbon black.

29. The invention according to claim 14, wherein said coloring agent comprises a pigment.

30. The invention according to claim 29, wherein said pigment comprises carbon black.

31. The invention according to claim 13, wherein said improvement further comprises the step of emulsifying an oil with a significant amount of water by blending said oil with a monovalent salt of an oxidized acid wax, whereby said ink vehicle comprises said oil, said monovalent salt, and at least about 10 percent by weight water.

32. The invention according to claim 31, wherein said blending step comprises the blending of said oil with the sodium soap of said oxidized acid wax.

33. The invention according to claim 31, wherein said blending step comprises the blending of said oil with the tri(hydroxyethyl)amine soap of said oxidized wax.

34. The invention according to claim 31, wherein said improvement additionally comprises the step of combining the resulting blend of said oil and said salt with said water, and wherein at least one of said combining and blending steps is carried out at a temperature of about 75° C. to 95° C.

35. The invention according to claim 31, wherein said blending step is carried out employing an amount of said salt such that said salt forms about 15 to 50 percent by weight of the resulting blend of said salt and said oil.

36. The invention according to claim 35, wherein said blending step is carried out employing an amount of salt such that said salt in about 25 to 40 percent by weight of the resulting blend of said salt and said oil.

37. The invention according to claim 31, wherein said improvement additionally comprises the step of combining the resulting blend of said oil and said salt with said water, and wherein said combining step comprises emulsifying said blend with a quantity of water such that said water forms about 10 to 50 percent by weight of said vehicle.

38. The invention according to claim 31, wherein said improvement comprises admixing said coloring agent with said blend of said oil and said salt, and subsequently combining said admixture with said water.

39. The method according to claim 31, wherein said improvement additionally comprises carrying out said emulsifying step employing an oil comprising a mineral oil.

40. The invention according to claim 31, wherein said improvement additionally comprises carrying out said emulsifying step using an oil comprising a light mineral oil having a viscosity at 25° C. of about 1 to 14 poise.

41. The invention according to claim 31, wherein said improvement additionally comprises carrying out said blending step employing an oxidized acid wax having an acid number from about 40 to 60 mg KOH/g.

42. The invention according to claim 31, wherein said improvement additionally comprises carrying out said blending step employing an oxidized acid wax derived from a wax selected from the class consisting of crystalline scale and slack waxes.

43. The invention according to claim 31, wherein said improvement further comprises carrying out said blending step employing an oxidized acid wax comprising a liquid oxidate mixture derived from paraffinic oil.

44. The invention according to claim 31, wherein said improvement comprises the preparation of an aqueous emulsion of said salt, and wherein said oil is subsequently blended with said salt by blending with said aqueous emulsion.

* * * * *

UNITED STATES PATENT AND TRADEMARK OFFICE
CERTIFICATE OF CORRECTION

PATENT NO.  : 5,000,092
DATED       : March 19, 1991
INVENTOR(S) : Robert D. M. Best It is certified that error appears in the above-identified patent and that said Letters Patent is hereby corrected as shown below:

Title Page, at Attorney, Agent, or Firm, delete "VenOphem" and insert ---- VanOphem ----.

Column 1, line 38, before "an" insert ---- as ----.

Column 2, line 14, delete "50°" and insert ---- 50 ----.

Column 3, line 12, delete "firstly" and insert ---- first ----.

Column 3, line 38, after "weight" insert a comma ---- , ----.

Column 3, line 55, delete "alow" and insert ---- low ----.

Column 4, line 40, delete "100 parts by weight of the".

Column 4, line 41, before "soap/oil" insert ---- 100 parts by weight of the ----.

Column 4, lines 41 through 51, begin all lines at the left margin.

Column 8, line 19, delete "in" and insert ---- is ----.

Signed and Sealed this

Twenty-second Day of September, 1992

*Attest:*

DOUGLAS B. COMER

*Attesting Officer*      *Acting Commissioner of Patents and Trademarks*